United States Patent
Ito et al.

(10) Patent No.: US 6,680,889 B1
(45) Date of Patent: Jan. 20, 2004

(54) DATA RECORDING MEDIUM AND DATA RECORDING APPARATUS

(75) Inventors: Shuichi Ito, Tokyo (JP); Tatsuya Inokuchi, Kanagawa (JP); Yoichiro Sako, Tokyo (JP); Masayuki Obata, Tokyo (JP); Kazuko Sakurai, Tokyo (JP)

(73) Assignee: Sony Corporation, Tokyo (JP)

( * ) Notice: Subject to any disclaimer, the term of this patent is extended or adjusted under 35 U.S.C. 154(b) by 99 days.

(21) Appl. No.: 09/610,060

(22) Filed: Jul. 5, 2000

(30) Foreign Application Priority Data

Jul. 5, 1999 (JP) .......................................... P11-190963

(51) Int. Cl.[7] ................................................ G11B 3/90
(52) U.S. Cl. ................. 369/53.2; 369/47.55; 369/275.3
(58) Field of Search .......................... 369/47.12, 47.13, 369/53.21, 53.2, 30.05, 30.07, 30.19, 47.55, 53.37, 53.41, 53.45, 83, 275.3

(56) References Cited

U.S. PATENT DOCUMENTS 5,694,381 A * 12/1997 Sako ....................... 369/47.12
5,729,516 A * 3/1998 Tozaki et al. ............. 369/47.12
5,796,828 A    8/1998 Tsukamoto et al.
5,825,731 A * 10/1998 Yokota ..................... 369/47.12
5,923,486 A    7/1999 Sugiyama et al.
6,320,829 B1 * 11/2001 Matsumoto et al. ...... 369/47.12

FOREIGN PATENT DOCUMENTS

WO         WO 98/13984         4/1998

* cited by examiner

Primary Examiner—Paul W. Huber
(74) Attorney, Agent, or Firm—Sonnenschein, Nath & Rosenthal LLP

(57) ABSTRACT

The invention provides a data recording medium and a data recording apparatus which are large in recording capacity and comparatively low in cost and secures protection of recorded information. The data recording medium has a data recording area, in which quantitative limitation information of a number of pieces of information grasped based on an information identification code regarding information to be recorded is recorded in advance.

20 Claims, 5 Drawing Sheets

DATA RECORDING MEDIUM AND DATA RECORDING APPARATUS

BACKGROUND OF THE INVENTION

This invention relates to a data recording medium and a data recording apparatus, and more particularly to a data recording medium of the so-called prepaid type and a data recording apparatus for a data recording medium of the type mentioned.

Generally, so-called prepaid cards are used widely for payment of a charge for traffic facilities such as trains and buses, public telephones and so forth.

A prepaid card for use with such a charge payment system as just mentioned includes a magnetic tape or the like on which a purchase amount of money is recorded in advance, and when it is inserted into a card reader provided for a ticket control machine or a telephone set to use it, the card reader reads the remaining amount of money recorded on the prepaid card, subtracts a charge from the read remaining amount of money in accordance with the number of units of use to calculate an updated remaining amount of money and re-records the updated remaining amount of money onto the magnetic tape or the like.

However, since such a prepaid card as described above is simple in structure, it is limited in recording capacity, and it is substantially impossible to record, for example, a music program on the prepaid card.

Further, since such a prepaid card as described above can be forged readily, it has been a problem on the market, and it is difficult to adopt it for a selling system of information such as, for example, a music program which requires a comparatively high charge of use.

Also a prepaid card which makes use of an IC card is known. However, the prepaid card of the type just described is disadvantageous in that it itself is expensive.

SUMMARY OF THE INVENTION

It is an object of the present invention to provide a data recording medium and a data recording apparatus which are large in recording capacity and comparatively low in cost and secures protection of recorded information.

In accordance with an aspect of the present invention, the object described above is achieved by a data recording medium having a data recording area, wherein quantitative limitation information of a number of pieces of information grasped based on an information identification code regarding information to be recorded is recorded in advance in the data recording area.

With the data recording medium, since quantitative limitation information of a number of pieces of information grasped based on an information identification code regarding information to be recorded is recorded in advance in the data recording area, when a data recording apparatus reads, upon recording of information, the quantitative limitation information recorded in the data recording area, if information requested coincides with the quantitative limitation information, then the requested information can be recorded into the data recording area of the data recording medium.

Consequently, for example, where quantitative limitation information is recorded in accordance with a charge paid in advance as a prepaid charge on the data recording medium, the number of pieces of information which can be recorded onto the data recording medium is recognized upon recording of information, and the data recording apparatus records the requested information into the data recording area of the data recording medium only when the number of pieces of information which can be recorded is equal to or greater than the requested number of pieces of information.

Preferably, the data recording area is a recordable data recording area, and a signal recorded on the data recording medium cannot be erased.

With the data recording medium, since the data recording area is a recordable data recording area and a signal recorded on the data recording medium cannot be erased, information recorded once cannot be erased. Consequently, alteration or erasure is impossible, and alternation to the quantitative limitation information can be prevented effectively. Accordingly, for example, where the data recording medium is used as a prepaid type data recording medium, there is no necessity to take a special countermeasure for protection of the prepaid information, and illegal use of the data recording medium can be prevented readily with certainty and at a low cost.

As an alternative, limitation information to a term of use regarding the information to be recorded may be recorded in advance in the data recording area.

With the data recording medium, since limitation information to a term of use regarding the information to be recorded is recorded in advance in the data recording area, the term of use regarding the information to be recording onto the data recording medium is set. Thus, for example, where the data recording medium is used as a prepaid type data recording medium, rapid information recording is promoted.

As another alternative, limitation information to a field regarding the information to be recorded may be recorded in advance in the data recording area.

With the data recording medium, since limitation information to a field regarding the information to be recorded is recorded in advance in the data recording area, for example, where the information to be recorded is music, an electronic novel or the like, the genre of the information is limited in advance. Consequently, utilization of the data recording medium as a present is promoted.

As a further alternative, limitation information to a seller regarding the information to be recorded may be recorded in advance in the data recording area.

With the data recording medium, since limitation information to a seller regarding the information to be recorded is recorded in advance in the data recording area, a seller, that is, a supplier of information recording, is limited in advance. Consequently, information recording is enabled only in a store or the like of a particular dealer.

As a still further alternative, limitation information to a proprietor regarding the information to be recorded may be recorded in advance in the data recording area.

With the data recording medium, since limitation information to a proprietor regarding the information to be recorded is recorded in advance in the data recording area, for example, a publishing company, a songwriter, a composer, an author of a work or the like is limited. Consequently, information recording regarding only a limited proprietor is performed.

As a yet further alternative, limitation information to time regarding the information to be recorded may be recorded in advance in the data recording area.

With the data recording medium, since limitation information to time regarding the information to be recorded is recorded in advance in the data recording area, for example, where the information to be recorded is music, the time for recording is limited. Consequently, an upper limit to the playing time of a tune to be recorded is set.

Preferably, when the information to be recorded is recorded, recording utilization information corresponding to the recorded information is recorded in the data recording area.

With the data recording medium, since, when the information to be recorded is recorded, recording utilization information corresponding to the recorded information is recorded in the data recording area, an information identification code, the quantity of pieces of information, the recording date and so forth of the recorded information are recorded as the recording utilization information into the data recording area.

Accordingly, when, upon recording of the information to be recorded, a data recording apparatus reads in the quantitative limitation information and the recording utilization information, it can recognize the remaining number of pieces of information by subtracting the number of recorded pieces of information based on the recording utilization information from the initial number of pieces of information based on the quantitative limitation information.

In accordance with another aspect of the present invention, the object described above can be achieved by a data recording apparatus, comprising a data recording medium having a data recording area, and a data recording section for recording information on the data recording medium, the data recording area of the data recording medium having recorded in advance therein quantitative limitation information of a number of pieces of information grasped based on an information identification code regarding information to be recorded, the data recording section being operable upon recording of information to read the quantitative limitation information recorded in the data recording area of the data recording medium and record, when information requested coincides with the quantitative limitation information, the requested information into the data recording area of the data recording medium.

With the data recording apparatus, since quantitative limitation information of a number of pieces of information grasped based on an information identification code regarding information to be recorded is recorded in the data recording area of the data recording medium, when the data recording apparatus reads, upon recording of information, the quantitative limitation information recorded in the data recording area, if information requested coincides with the quantitative limitation information, then the requested information is recorded into the data recording area of the data recording medium.

Consequently, for example, where quantitative limitation information is recorded in accordance with a charge paid in advance as a prepaid charge on the data recording medium, the number of pieces of information which can be recorded onto the data recording medium is recognized upon recording of information, and the data recording apparatus records the requested information into the data recording area of the data recording medium only when the number of pieces of information which can be recorded is equal to or greater than the requested number of pieces of information.

Accordingly, for example, where the data recording medium is used as a prepaid type data recording medium, protection of the prepaid information can be achieved, and illegal use of the data recording medium can be prevented readily with certainty and at a low cost.

Preferably, the data recording section reads, upon recording of information, also recording utilization information when the data recording section reads the quantitative limitation information recorded in the data recording area of the data recording medium, and records, when the data recording section records requested information into the data recording area of the data recording medium, recording utilization information corresponding to the recorded information.

With the data recording apparatus, when the data recording section reads, upon recording of information, the quantitative limitation information recorded in the data recording area of the data recording medium, it also reads recording utilization information, and when the data recording section records requested information into the data recording area of the data recording medium, it records recording utilization information corresponding to the recorded information. Consequently, upon the next information recording, the data recording apparatus first reads in the quantitative limitation information and the recording utilization information from the data recording medium, and recognizes the remaining number of pieces of information, which can be recorded onto the data recording medium, from the quantitative limitation information and the recording utilization information, and then records the remaining number of pieces of recordable information as well as the requested information into the data recording area of the data recording medium.

Accordingly, processing based on the quantitative limitation information is performed with certainty by the data recording apparatus.

Thus, according to the present invention, a data recording medium and a data recording apparatus can be provided which are great in recording capacity and comparatively low in cost and secure protection of recorded information.

The above and other objects, features and advantages of the present invention will become apparent from the following description and the appended claims, taken in conjunction with the accompanying drawings in which like parts or elements denoted by like reference symbols.

DETAILED DESCRIPTION OF THE PREFERRED EMBODIMENT

Figure 1:
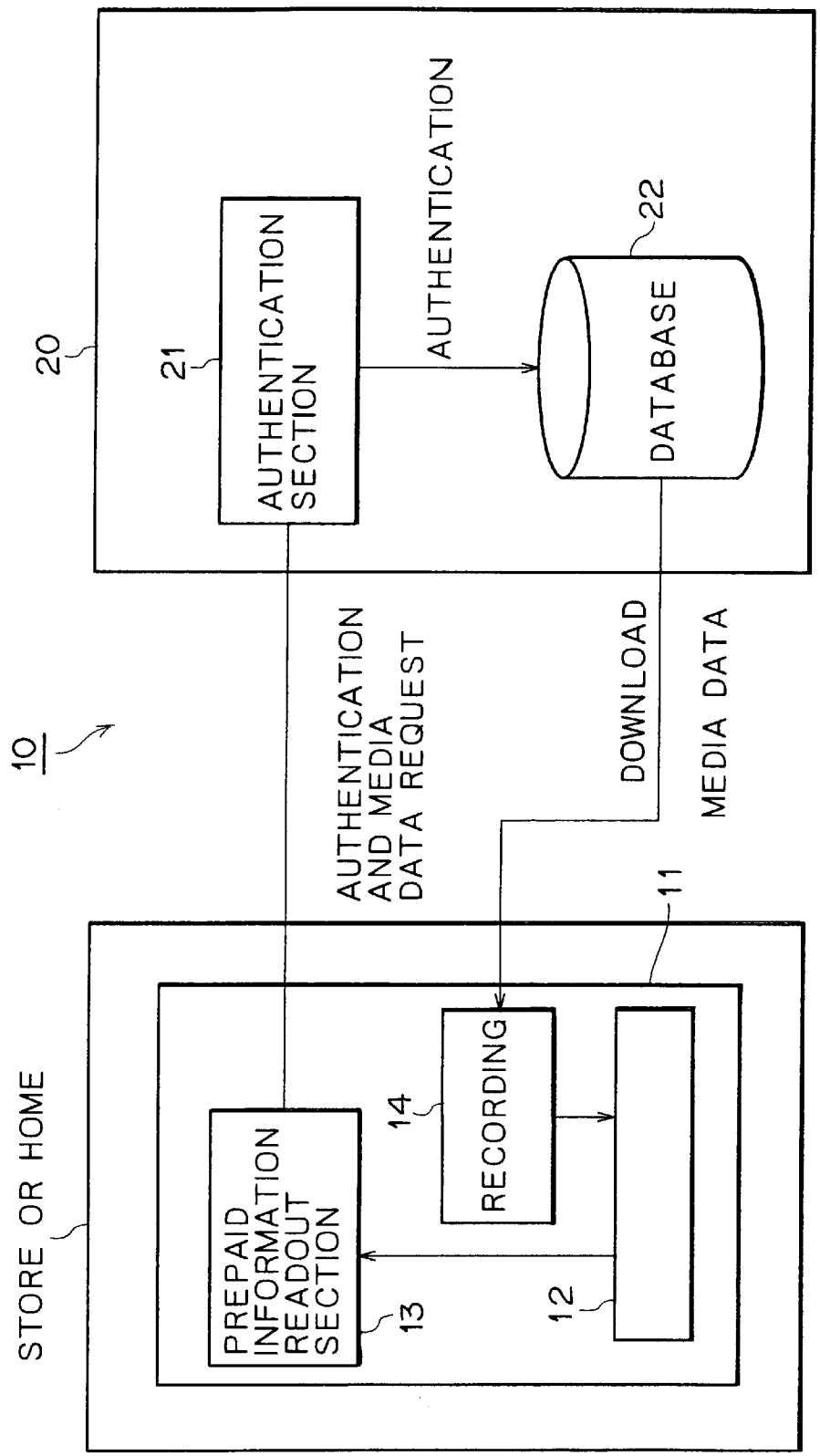
FIG. 1 is a schematic diagram showing a construction of a data recording apparatus to which the present invention is applied.

Referring first to FIG. 1, there is shown a construction of a data recording apparatus to which the present invention is applied. The data recording apparatus is generally denoted at 10 and formed as a data recording apparatus for recording, for example, music as information. The data recording apparatus 10 includes a data recording section 11, and a data supplying section 20.

The data recording section 11 is disposed, for example, in a store or in a house (home) of a user and includes an information reading section 13 for playing back a compact disk recordable (CD-R) 12 as a recordable data recording medium to read out prepaid information (hereinafter described), and a recording section 14 for recording information to be recorded.

Meanwhile, the data supplying section 20 is disposed, for example, in a store, an office or the like of a data supplier and includes an authentication section 21 to which prepaid information of a CD-R 12 read out by the information reading section 13 of the data recording section 11 and data request contents are inputted, and a database 22 for outputting, when authentication is performed by the authentication section 21, the requested information based on contents of the data request.

Further, the data recording section 11 and the data supplying section 20 are connected to each other by a circuit such as a public network or a leased circuit or by radio.

Figure 2:
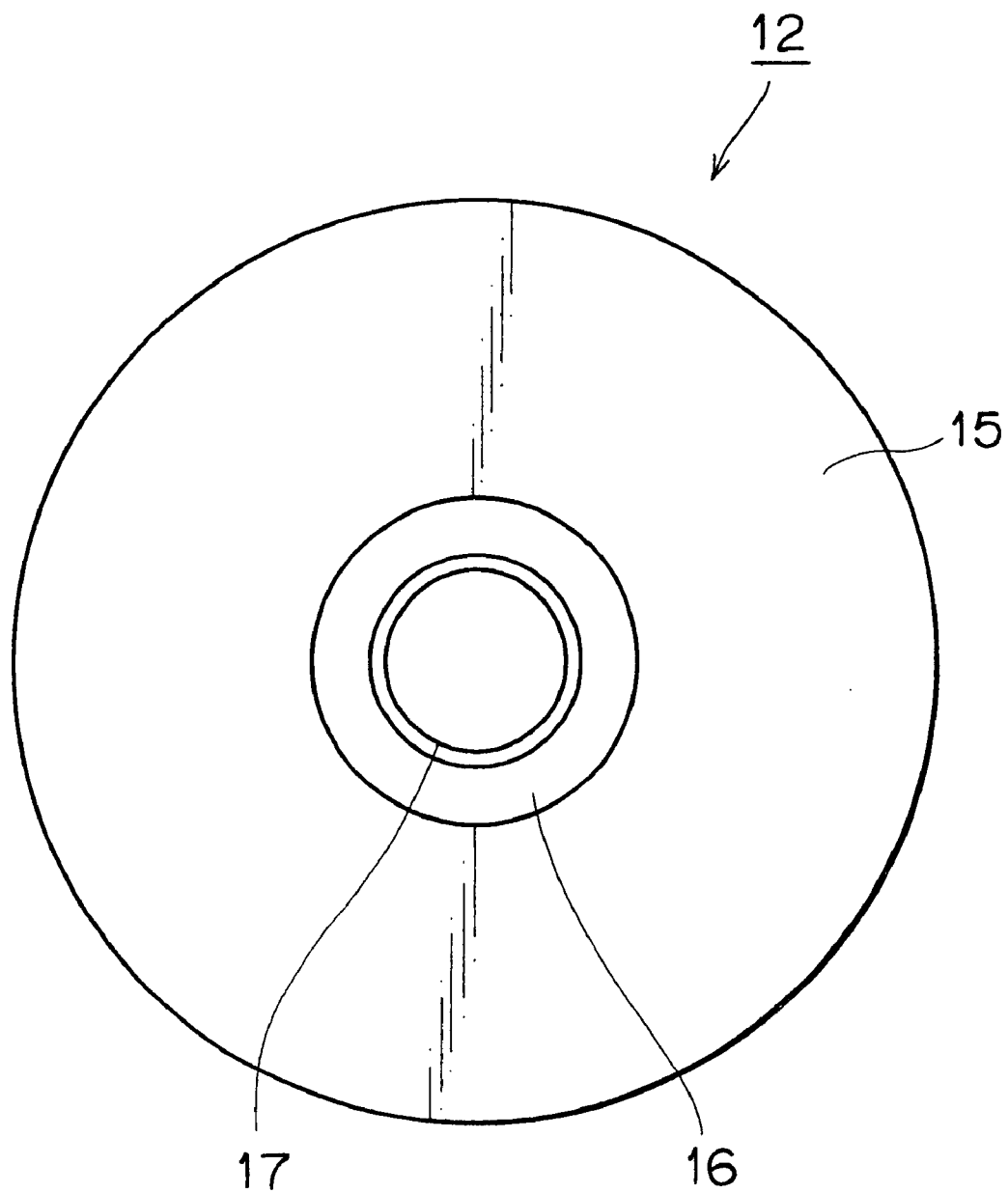
FIG. 2 is a schematic view showing a construction of a CD-R as a data recording medium used in the data recording apparatus of FIG. 1.
Figure 3:
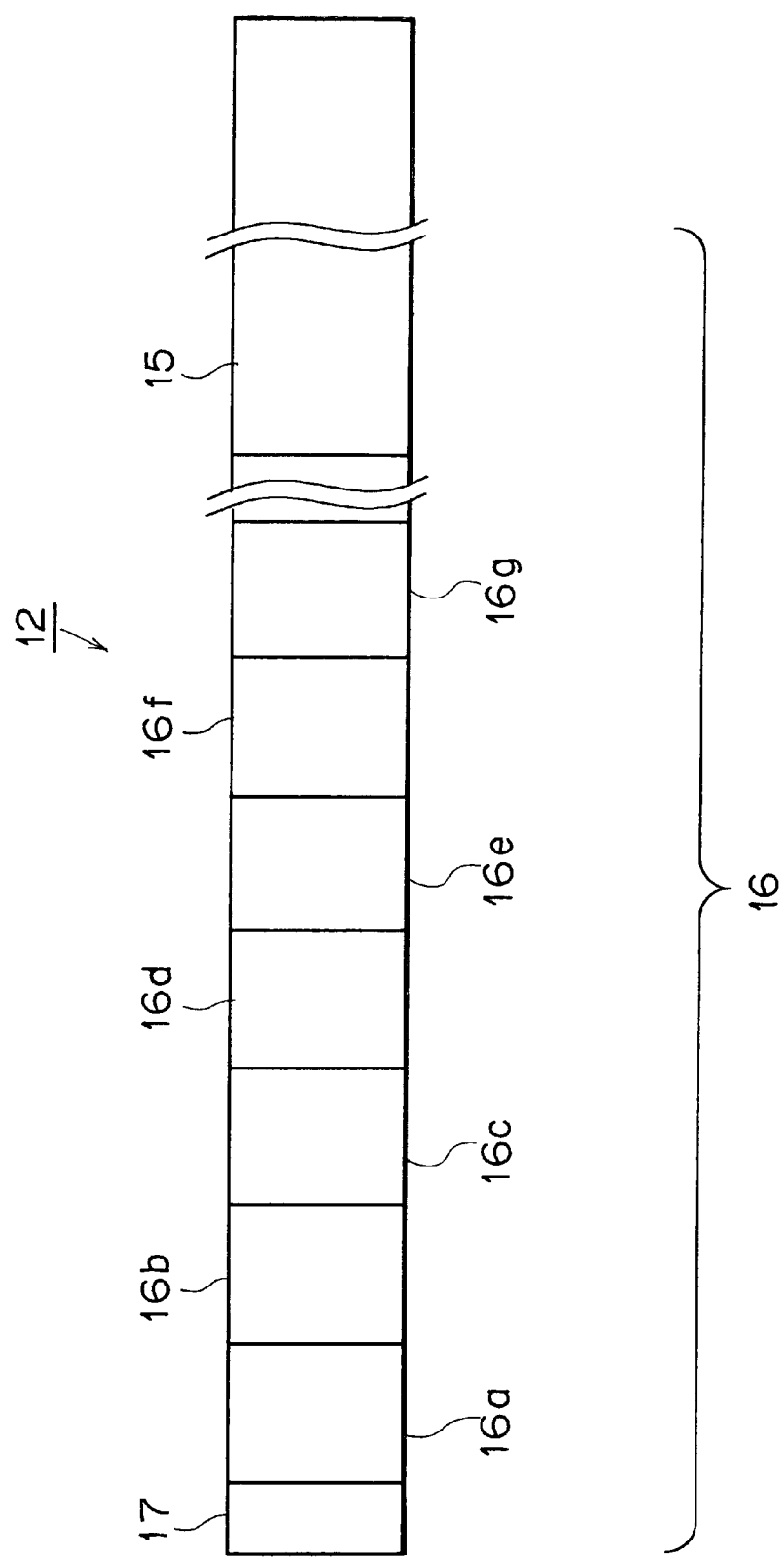
FIG. 3 is a schematic diagrammatic view illustrating several different data recorded in an information storage area of the CD-R of FIG. 2.

The CD-R 12 mentioned above is configured in such a manner as seen in FIGS. 2 and 3.

Referring first to FIG. 2, the CD-R 12 is formed as a disk and has a data recording area which is composed of three concentrical areas including a data storage area 15, a information storage area 16 formed on the inner side of the data storage area 15, and a system area 17 formed on the inner side of the information storage area 16.

The information storage area 16 has a prepaid information area whose size is fixed by reserving tracks (a state wherein track information is registered in a PMA (program memory area) but actually nothing is registered on the tracks) or making use of the last end of the data storage area 15.

Such data, that is, prepaid information, is recorded, for example, in accordance with a fixed length packet recording method. However, some other recording method, for example, a track-at-once recording method or a variable length packet recording method may be used to record the prepaid information.

Further, in the information storage area 16, the size of the prepaid information area need not directly correspond to a used amount of money. In other words, it is possible to record some other information regarding information to be recorded in the information storage area 16. More particularly, the CD-R 12 includes, as shown in FIG. 3, program number data 16a as quantitative limitation information, use term data 16b as useable period limitation information, genre data 16c as field limitation information, artist data 16d as proprietor limitation information, dealer data 16e as seller limitation information, proprietor data 16f as proprietary limitation information, and utilization log data 16g as recording utilization information.

Figure 4:
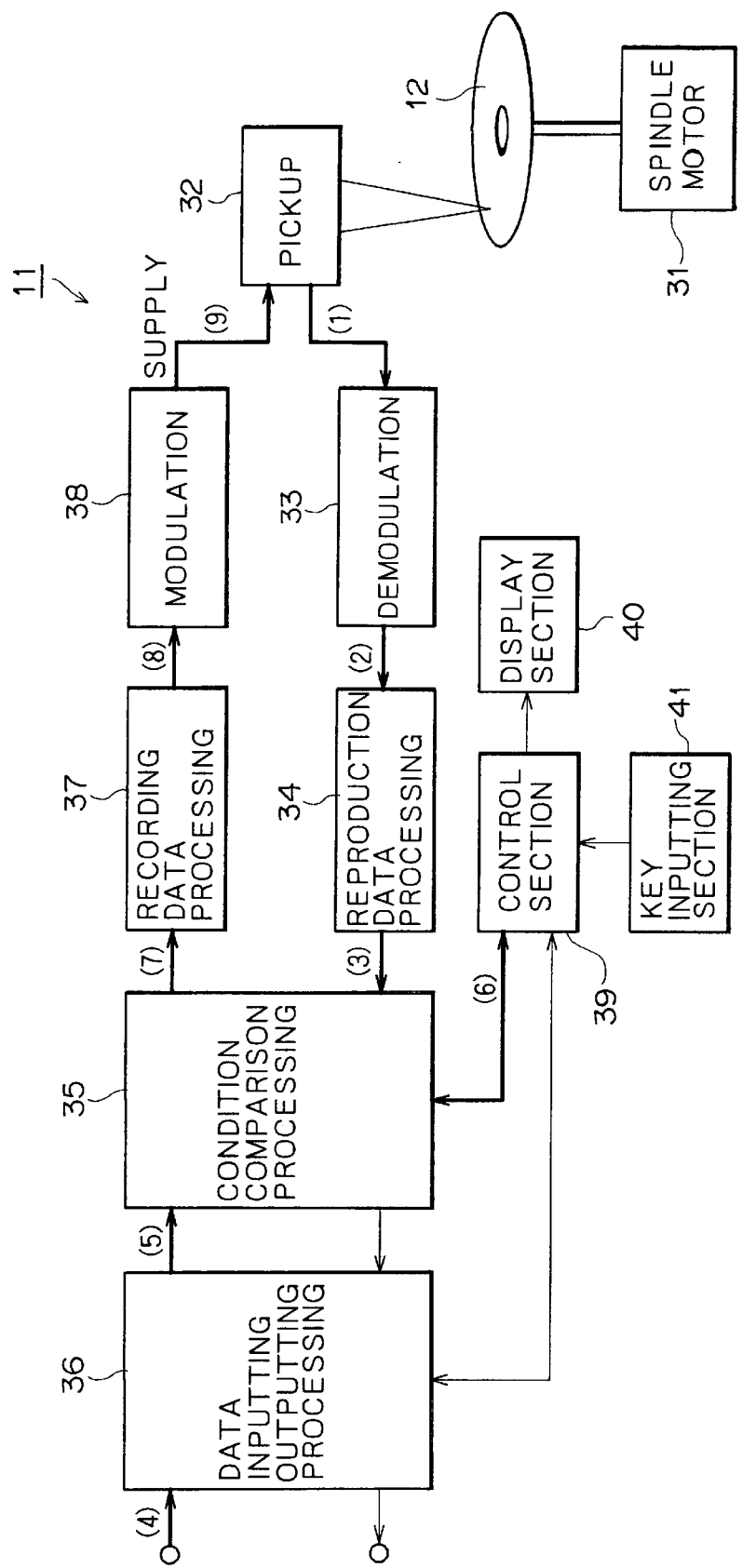
FIG. 4 is a block diagram showing an electrical construction of a data recording section of the data recording apparatus of FIG. 1.

FIG. 4 shows an electric construction of the data recording section 11.

Referring to FIG. 4, the data recording section 11 includes a spindle motor 31 for driving the CD-R 12 to rotate, an optical pickup 32 for recording and reproducing information onto and from the CD-R 12, and a demodulation circuit 33 to which a reproduction signal from the optical pickup 32 is inputted.

The data recording section 11 further includes a reproduction data processing circuit 34 for taking out reproduction data from a demodulation signal from the demodulation circuit 33, a condition comparison processing section 35 for performing comparison or collation based on the reproduction data from the reproduction data processing circuit 34, and a data inputting/outputting processing section 36 for performing inputting/outputting data between the condition comparison processing section 35 and the data supplying section 20.

The data recording section 11 further includes a recording data processing section 37 for processing recording data inputted through the condition comparison processing section 35 from the data inputting/outputting processing section 36, and a modulation circuit 38 for modulating a signal from the recording data processing section 37 and outputting the modulated signal as a recording signal to the optical pickup 32.

Furthermore, the data recording section 11 includes a control section 39 for controlling the condition comparison processing section 35 and the data inputting/outputting processing section 36, a display section 40 for displaying a signal from the control section 39, and a key inputting section 41 for performing an inputting operation to the display section 40.

In the data recording section 11 having the construction described above, when the spindle motor 31 rotates, the CD-R 12 is driven to rotate. Then, the optical pickup 32 reads out the data 16a to 16g of the information storage area 16 of the CD-R 12.

The data 16a to 16g read out in this manner are demodulated by the demodulation circuit 33 and then extracted as data 16a to 16g by the reproduction data processing circuit 34.

Meanwhile, the condition comparison processing section 35 receives condition data inputted thereto from the data supplying section 20 through the data inputting/outputting processing section 36. The condition comparison processing section 35 thus collates the data 16a to 16g with the condition data.

If a result of the collation exhibits coincidence with the condition with regard to some tunes, then a list of the tunes is supplied from the control section 39 to the display section 40 so that it is displayed on the display section 40. Then, the user may manually operate the key inputting section 41 to selectively input a desired tune from within the list of tunes.

In response to the input, the condition comparison processing section 35 requests data of the selected tune to the data supplying section 20 through the data inputting/outputting processing section 36. Consequently, the requested tune data is inputted from the data supplying section 20 to the condition comparison processing section 35 through the data inputting/outputting processing section 36.

The thus requested tune data is inputted from the condition comparison processing section 35 to the recording data processing section 37. Consequently, the recording data processing section 37 refers to a tune identification code regarding the requested tune to produce recording utilization data (utilization log data) and outputs the recording utilization data to the modulation circuit 38 together with the requested tune data.

Thus, the requested tune data modulated by the modulation circuit 38 is recorded into the data storage area 15 of the CD-R 12 by the optical pickup 32, and the recording utilization data is written into the utilization log data 16g of the information storage area 16 of the CD-R 12.

It is to be noted that, upon the collation performed by the condition comparison processing section 35 described above, that is, upon comparison between the condition data from the data supplying section 20 and the data 16a to 16g read out from the CD-R 12, all data may be collated.

However, it is otherwise possible to construct the condition comparison processing section 35 such that collation is not performed with regard to data to which a free mark has been applied in advance on the data supplying section 20 side or the data recording section 11 side.

Accordingly, by applying a free mark to any of the data 16a to 16g in advance on the data supplying section 20 side or the data recording section 11 side, various collation conditions can be set in accordance with a combination of such data.

For example, by collating the use term data 16b, it is possible to provide a term to use, that is, a term to information recording of the CD-R 12 in order to contemplate popularization or sales of a tune within a short fixed period.

Or, by collating the genre data 16c, it is possible to perform recording of tunes of, for example, a particular genre such as, for example, the jazz to contemplate popularization of the jazz.

Further, by collating the artist data 16d, dealer data 16e or proprietor data 16f, it is possible to effect recording limiting tunes to those of a particular artist, dealer (sales ownership store), publishing company, composer, songwriter or the like.

Also it is possible to record that, upon recording onto the CD-R 12, a particular tune so that the CD-R 12 may be utilized for campaign of the particular tune.

The data recording apparatus 10 according to the embodiment of the present invention is constructed in such a manner as described above, and the CD-R 12 as a data recording medium has tunes recorded in such a manner as described below.

Figure 5:
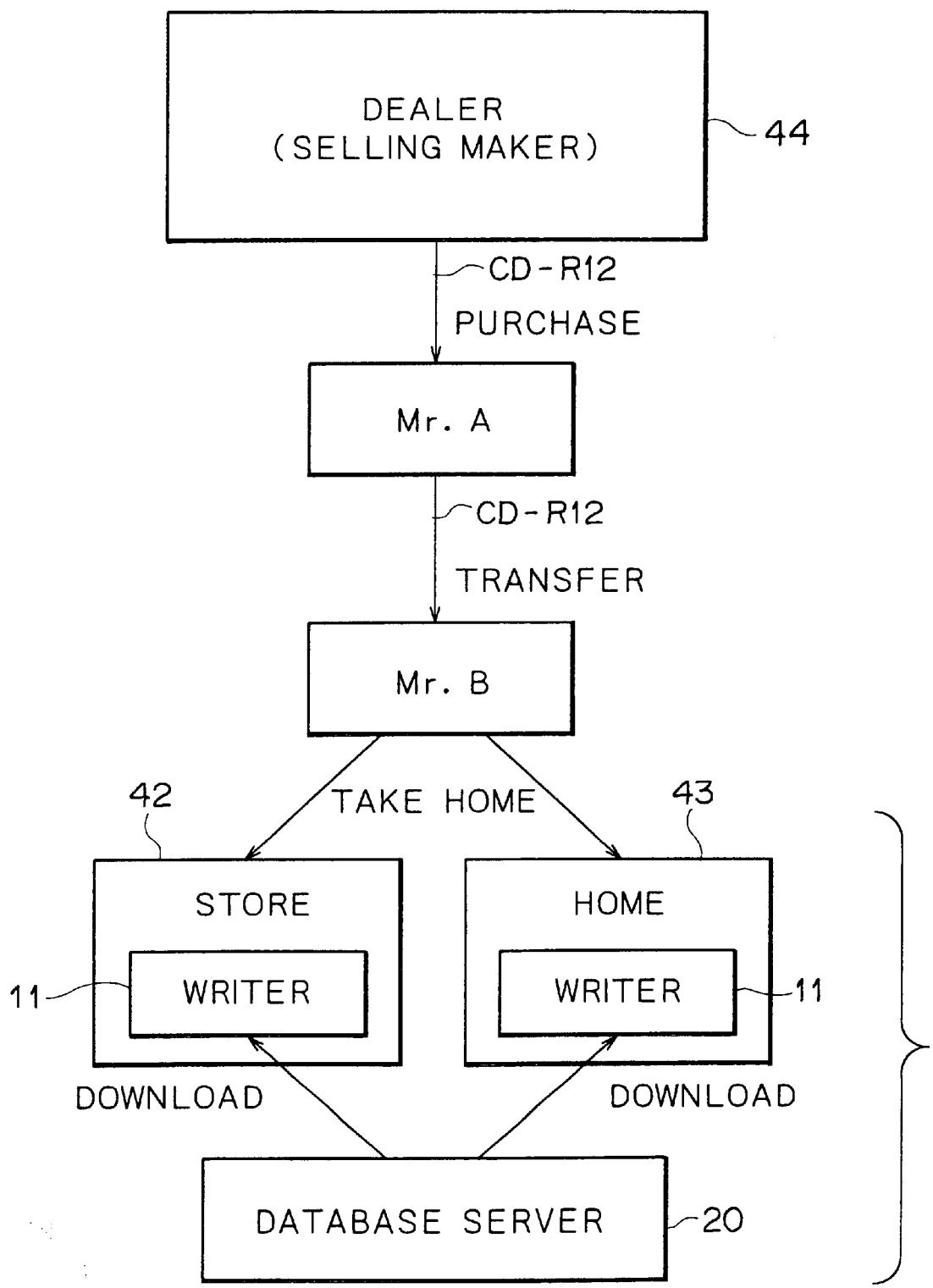
FIG. 5 is a schematic diagrammatic view showing an example of use of a CD-R as a data recording medium in the data recording apparatus of FIG. 1.

In particular, as seen from FIG. 5, a user A will purchase a CD-R 12 from a dealer (or selling maker) 44. In this instance, on the CD-R 12, recordable program number data 16a corresponding to a purchase amount of money is recorded in the information storage area 16, and when necessary, other data 16b to 16f are recorded by selection of the user A or as set in advance by the dealer side.

Then, the user A will transfer the CD-R 12, for example, as a present or the like to a user B.

Consequently, the user B can use the data recording section 11 disposed in a store 42 or a home 43 to select a desired tune from among tunes limited by the data 16a to 16f in advance as described above so that the desired tune may be recorded onto the CD-R 12.

Here, the user B can select a plurality of tunes up to an upper limit number provided by the number of programs recordable in accordance with the program number data 16a recorded in the information storage area 16 of the CD-R 12. In this instance, if a number of tunes equal to the full number are not selected, then the utilized program number is recorded as the utilization log data 16g. Consequently, upon subsequent recording of tunes, the remaining program number is recognized from the program number data 16a and the utilization log data 16g, and recording of tunes can be performed in accordance with the remaining program number.

It is to be noted that the user A by itself may record a tune onto the CD-R 12 without transferring it to the user B, and may transfer the CD-R 12, on which tunes are already recorded, to the user B.

In the data recording apparatus 10 of the embodiment described above, program number data 16a which can be recorded as prepaid information is recorded in the information storage area 16, and when a tune is recorded, utilization log data 16g is recorded into the information storage area 16 so as to allow recognition of the remaining program number. However, the information storage area 16 need not necessarily be constructed in such a manner as just described, but may be formed in the following manner.

In particular, for example, if the prepaid information area has 80,000 free blocks (for example, in the case of 50 frames per second, for the time of 17 minutes 46 seconds) and fixed length packets having a packet length equal to one block are recorded, then totaling 10,000 packets can be recorded. Accordingly, if the prepaid information is recorded such that 1 packet represents, for example, one yen and the recorded portion represents a used amount of money while the non-recorded portion represents the remaining amount of money, then prepaid processing for ten thousand yen can be performed with the single CD-R 12.

Where the remaining amount of money is represented by the magnitude of the non-recorded portion of the prepaid information area of the information storage area 16 in this manner, even if the prepaid information area is altered, since the already recorded portion cannot be erased, any recording for the alteration decreases the non-recorded portion, resulting in decrease of the remaining amount of money. Therefore, such alteration is meaningless.

Further, a progress of the alteration can be detected by checking all information recorded on the recorded portion. This makes use of the physical characteristic of the non-reversibility of the CD-R 12 that alternation to prepaid information is physically impossible and, once information is recorded, it cannot be erased.

While the data recording apparatus 10 of the embodiment described above uses a recordable CD-R as a data recording medium, it is apparent that a non-recordable data recording medium may be used alternatively, of instead, some other data recording medium such as a mini disk (MD) or a semiconductor memory may be used.

Further, while, in the foregoing description, it is described that the user A transfers the CD-R 12, for example, as a present to the user B, the user A itself, who is a purchasing person, may record a tune onto the CD-R 12.

Further, while, in the foregoing description, it is described that a tune is recorded onto a data recording medium, it is apparent that the present invention can be applied also to prepaid type recording of any other contents information such as, for example, an electronic novel, an image or a computer program.

As described above, with the data recording apparatus 10 of the present embodiment, since the program number data 16a and so forth are recorded in advance in the information storage area 16 of the CD-R 12, when, upon information recording, the data recording section 11 reads out the information of the program number data 16a and so forth, if a requested tune coincides with the information of the program number data 16a and so forth, then the data recording section 11 records the requested tune data into the data storage area 15 of the CD-R 12 and records recording utilization data into the utilization log data 16g of the CD-R 12.

Further, since the recordable CD-R 12 is used and consequently information recorded once cannot be rewritten, alteration or erasure is impossible. As a result, alternation to information of the program number data 16a and so forth is prevented effectively. Accordingly, for example, where the CD-R 12 is used as a prepaid type CD-R, there is no necessity to take a special countermeasure for protection of the prepaid information, and illegal use of the prepaid CD-R can be prevented readily with certainty and at a low cost.

While a preferred embodiment of the present invention has been described using specific terms, such description is for illustrative purposes only, and it is to be understood that changes and variations may be made without departing from the spirit or scope of the following claims.

What is claimed is:

1. A data recording medium comprising:
   a blank recording area for recording supplied data; and
   a pre-recorded area storing collation information that indicates whether the supplied data may be recorded in the blank recording area.

2. The data recording medium of claim 1, wherein collation information comprises an identification code of the supplied data.

3. The data recording medium of claim 1, wherein collation information comprises a quantitative restriction on the supplied data.

4. The data recording medium of claim 1, wherein collation information comprises a time period restriction for recording the supplied data.

5. The data recording medium of claim 1, wherein collation information comprises a genre restriction on the supplied data.

6. The data recording medium of claim 1, wherein collation information comprises a dealer restriction on the supplied data.

7. The data recording medium of claim 1, wherein collation information comprises a proprietor restriction on the supplied data.

8. The data recording medium of claim 1, wherein collation information comprises a time restriction on the supplied data.

9. The data recording medium of claim 1, wherein collation information includes a utilization log for indicating a number of programs written in the blank recording area.

10. The data recording medium of claim 1, wherein collation information comprises a prepaid information area.

11. The data recording medium of claim 1, wherein the pre-recorded area is a write-once recording area.

12. A data recording apparatus for recording supplied data on a data recording medium, the data recording section comprising:
    a data pickup for retrieving collation information stored on a data recording medium, the collation information comprising restrictions on writing information to the data recording medium;
    an input circuit for receiving supplied data and associated condition data from a server;
    a processing circuit for collating the condition data with the collation information; and
    a recording circuit for writing at least a portion of the supplied data from the server onto the data recording medium when the condition data matches the collation information.

13. The data recording section of claim 12, further comprising a display for displaying a list of supplied data for which condition data correlates with the collation information.

14. The data recording section of claim 12, further comprising a user input section for accepting a selection for at least a portion of the supplied data.

15. The data recording section of claim 12, wherein collation information comprises an identification code for the supplied data.

16. The data recording section of claim 12, wherein collation information comprises a quantitative restriction on the supplied data.

17. The data recording section of claim 12, wherein collation information comprises a time period restriction for recording the supplied data.

18. A method for restricting information recorded on a recording medium, the method comprising the steps of:
    retrieving collation information stored on a data recording medium, the collation information comprising restrictions on writing information to the data recording medium;
    receiving supplied data and associated condition data from a server;
    collating the condition data with the collation information; and
    writing at least a portion of the supplied data from the server onto the data recording medium when the condition data matches the collation information.

19. The method of claim 18, wherein collating the condition data with the collation information comprises collating the condition data with an identification code for the supplied data.

20. The method of claim 18, wherein collating the condition data with the collation information comprises collating the condition data with a quantitative restriction on the supplied data.

* * * * *